United States Patent [19]

Sato et al.

[11] Patent Number: 5,573,200
[45] Date of Patent: Nov. 12, 1996

[54] HOOK TYPE COIL WINDING MACHINE

[75] Inventors: Kazuhiro Sato, Kanagawa; Hiroyuki Watanabe; Takashi Shoji, both of Tokyo, all of Japan

[73] Assignee: Sony Corporation, Tokyo, Japan

[21] Appl. No.: 224,863

[22] Filed: Apr. 8, 1994

[30] Foreign Application Priority Data

Apr. 13, 1993 [JP] Japan .................................. 5-109937

[51] Int. Cl.$^6$ .............................. B65H 81/02; H01F 7/06
[52] U.S. Cl. ........................................ 242/434.8; 29/605
[58] Field of Search .................................. 242/4 R, 4 C, 242/434.8; 29/605

[56] References Cited

U.S. PATENT DOCUMENTS

| | | |
|---|---|---|
| 4,424,939 | 1/1984 | Ohashi et al. . |
| 4,491,281 | 1/1985 | Dosaka ..................................... 242/4 R |
| 4,601,433 | 7/1986 | Hayashi et al. .......................... 242/4 R |
| 4,771,956 | 9/1988 | Sato et al. ................................ 242/4 R |
| 4,917,316 | 4/1990 | Suzuki . |
| 4,988,047 | 1/1991 | Kariya et al. ............................ 242/4 R |

FOREIGN PATENT DOCUMENTS

| | | | |
|---|---|---|---|
| 2635904 | 2/1990 | France . | |
| 205905 | 8/1988 | Japan ..................................... | 242/4 R |
| 114013 | 5/1989 | Japan ..................................... | 242/4 R |

Primary Examiner—Michael R. Mansen
Attorney, Agent, or Firm—Ronald P. Kananen

[57] ABSTRACT

A hook type coil winding machine is disclosed wherein an occupation rate of a wire which is threaded into a core hole of a head and wound on the head is increased and the deviation of physical properties of cores produced thereon is reduced. Also, the difficulty in winding at a last stage which is caused by the wire which gathers only at a portion of the core hole, is eliminated. In the hook type coil winding machine, a wire is threaded through a small core hole of a head core of a head for a hard disk drive or a video head and wound on the head core. The relative positions of the wire and the head core are controlled for each turn of the wire to achieve aligned winding of the wire to improve the occupation ratio of the wire in the core hole and assure correct winding of the wire by a predetermined number of turns.

6 Claims, 21 Drawing Sheets

HOOK TYPE COIL WINDING MACHINE

BACKGROUND OF THE INVENTION

1. Field of the Invention

This invention relates to a hook type coil winding machine, and more particularly to a hook type coil winding machine wherein a wire is threaded into a core hole formed in a core and wound on the core.

2. Description of the Related Art

A magnetic head, for example, of a video tape recorder or a hard disk drive includes a coil which is formed by threading a wire formed from a thin wire material into a core hold formed in a core of the head and winding the wire around one of a pair of portions of the core which define the core hole therebetween thereby to form a coil. The coil is used to read or write a signal by way of electromagnetic induction or magnetic induction.

Accordingly, in order to manufacture a magnetic head for a video tape recorder or a hard disk drive, a wire must be threaded into a hole of a core and wound on the core. To this end, a hook type coil winding machine is used. In the hook type coil winding machine, a hook adapted to hook or catch a wire at an end thereof is threaded into a core hole of a core and catches a wire, and then the hook is pulled back to introduce the wire into and through the core hole, whereafter an end portion of the wire is clamped and turned by a turning clamper to wind the wire around the core to form a coil.

With a conventional hook type coil winding machine of the construction described above, however, a wire is wound but not in an aligned condition since the machine does not have a function of controlling the position of a wire being wound and the wire is wound in a natural or uncontrolled condition. Consequently, the conventional hook type coil winding machine is disadvantageous in the following points.

In particular, the occupation rate of the wire in the core hole is so low that the core hole is occupied fully before the wire is wound by a predetermined number of turns, resulting in failure to wind the wire by the predetermined number of turns. Further, the winding condition is not always uniform among different works, resulting in deviation in characteristic of works, that is, cores of magnetic heads after the winding step. Furthermore, a wire is liable to gather at a portion of the core hole, which makes winding at a last stage of the winding operation difficult, resulting in deterioration of the yield.

SUMMARY OF THE INVENTION

It is an object of the present invention to provide a hook type coil winding machine which can wind a wire correctly by a predetermined number of turns.

It is another object of the present invention to provide a hook type coil winding machine which eliminates a deviation of physical properties of cores produced thereon.

It is a further object of the present invention to provide a hook type coil winding machine which eliminates the difficulty in winding at a last stage which is caused by a wire which gathers only at a portion of a core hole.

In order to attain the objects described above, according to an aspect of the present invention, there is provided a hook type coil winding machine, which comprises supporting means for supporting thereon a core which has a core hole formed therein such that a wire to be wound on the core can be threaded through the core hole, a chuck operable to grasp and move the wire to a predetermined position, a hook operable to move through the core hole of the core supported on the supporting means to catch the wire at the predetermined position and then move back through the core hole to thread the wire through the core hole, and lift position adjustment means for moving the supporting means in a vertical direction to adjust a vertical position of the core on the supporting means upon the backward movement of the hook or upon the movement of the chuck.

In the hook type coil winding machine, the vertical position of the core is adjusted upon the backward movement of the hook or upon the movement of the chuck by moving the supporting means upwardly or downwardly by means of the lift position adjustment means, and in this condition, the wire is wound on the core. Accordingly, the wire can be wound in a well aligned condition in the core hole by such position adjusting operation for the core in the vertical direction by the lift position adjustment means.

According to another aspect of the present invention, there is provided a hook type coil winding machine, which comprises supporting means for supporting thereon a core which has a core hole formed therein such that a wire to be wound on the core can be threaded through the core hole, a chuck operable to grasp and move the wire to a predetermined position, a hook operable to move through the core hole of the core supported on the supporting means to catch the wire at the predetermined position and then move back through the core hole to thread the wire through the core hole, and lift position adjustment means for moving the chuck in a vertical direction to adjust a vertical position of the chuck upon the backward movement of the hook or upon the movement of the chuck.

In the hook type coil winding machine, the vertical position of the chuck is adjusted upon the backward movement of the hook or upon the movement of the chuck by moving the supporting means upwardly or downwardly by means of the lift position adjustment means, and in this condition, the wire is wound on the core. Accordingly, the wire can be wound in a well aligned condition in the core hole by such position adjusting operation for the chuck in the vertical direction by the lift position adjustment means.

In either of the hook type coil winding machines, where a wire layer including a plurality of turns of the wire is formed on another wire layer including a plurality of turns of the wire, preferably a stroke of movement when the chuck is moved upwardly or downwardly in a single winding operation for a turn may be set greater upon formation of an upper layer of the wire than upon formation of a lower layer of the wire. Such difference in stroke of the movement of the chuck makes it possible to form an upper layer of the wire in a correctly aligned condition on a lower layer of the wire.

Preferably, either of the hook type coil winding machines further comprises a wire holder located in an opposing relationship to an end portion of the wire in an axial direction of a coil being formed when the hole is threaded through the core wire and wound on the core. Due to the provision of the wire holder, the wire is wound in a condition wherein the end portion of the wire in the axial direction of the coil being formed is controlled by the wire holder. Accordingly, the wire can be wound correctly and is prevented from protruding from the end portion of the coil being formed in the axial direction of the coil.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
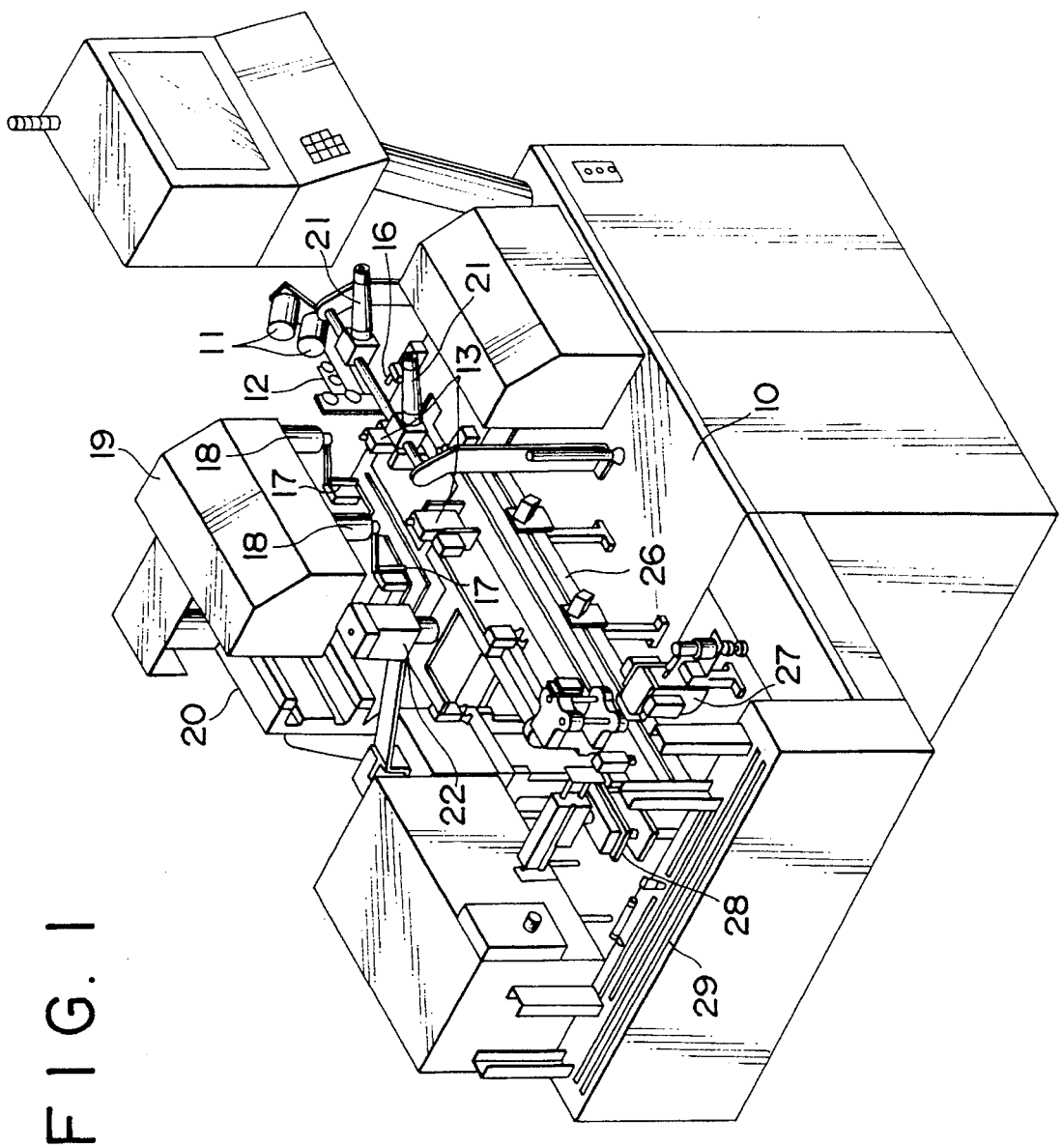
FIG. 1 is a perspective view showing an appearance of an entire hook type coil winding machine to which the present invention is applied.

Referring first to FIG. 1, there is shown a hook type coil winding machine to which the present invention is applied. The coil winding machine shown includes a base 10 on a platform. A plurality of wire supply bobbins 11 are provided on the upstream side in a wire supplying direction on the base 10 so that a wire 50 can be supplied from any of the bobbins 10. A tension mechanism 12 is located on the downstream side of the wire supply bobbins 11. A pair of chip holders 13 are located on the downstream side of the tension mechanism 12 and each adapted to support thereon a member for holding a core onto which a wire is to be wound such as a head base.

A hook 16 is located in front of each of the chip holders 13. A pair of flyer chucks 17 are located on the opposite side of the hooks 16 with respect to the chip holders 13 and are each pivoted by a spindle 18. The spindles 18 are mounted at lower portions of a spindle drive section 19. The spindle drive section 19 is located on a traverse section 20. A pair of microscopes 21 are located forwardly of and in an individually opposing relationship to the chip holders 13. An image processing section 22 is located alongside the spindle drive section 19.

A movable rail 26 is located below the locations of the chip holders 13 and extends in a transverse direction, and a terminal processing apparatus 27 is located on the terminal end side of the movable rail 26. A work taking out apparatus 28 is located adjacent an end of the terminal processing apparatus 27, and a magazine 29 is located below the work taking out apparatus 28.

Subsequently, a mechanism for traversing the flyer chucks 17 in a horizontal direction and a vertical direction will be described with reference to FIG. 13. The mechanism includes a frame 32, and a pair of guide rails 33 located in a transverse direction on a front face of the frame 32. A movable plate 34 is supported for movement in a horizontal direction along the guide rails 33. The movable plate 34 is adjusted in position in the horizontal direction by means of a feed screw 36 which is driven to rotate by a motor 35.

A support plate 38 is supported on the movable plate 34 for movement in a vertical direction by vertical guide means. The support plate 38 is moved in a vertical direction by means of a pulley 39 and a feed screw 40. The pulley 39 is driven to rotate by a motor not shown located on a rear face of the support plate 38.

Subsequently, a mechanism for moving a work in a vertical direction and a horizontal direction will be described with reference to FIG. 14. The mechanism includes a movable plate 43 which is moved in a horizontal direction by means of a motor 44 and a feed screw 45.

A slide table 46 is supported for movement in a vertical direction on the movable plate 43. The slide table 46 is fed in a vertical direction by means of a motor 47 and a feed screw 48. A work mounting plate 49 is located at an upper end of the slide table 46.

Figure 25:
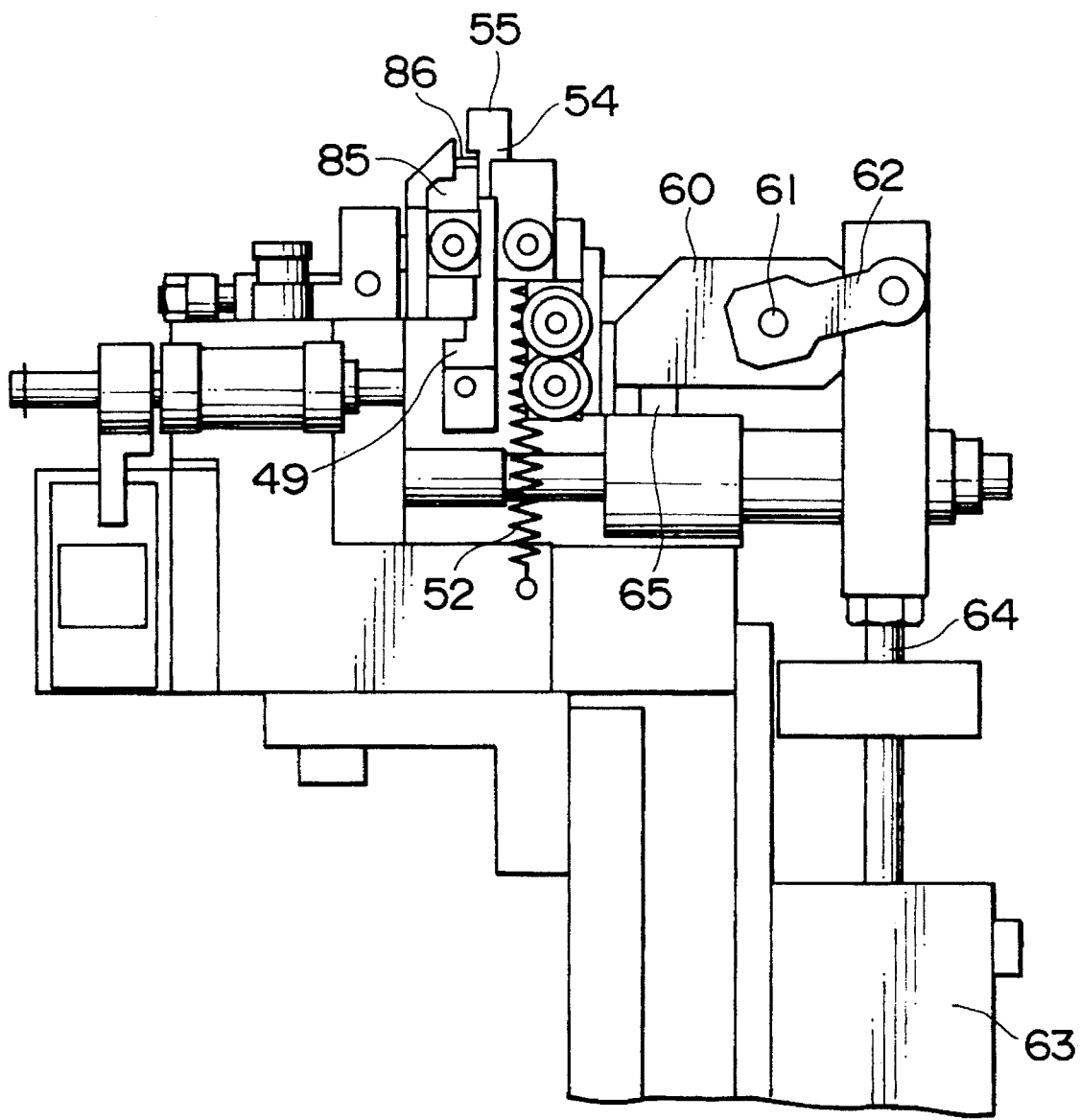
FIG. 25 is a front elevational view showing a drive mechanism for a wire holder of the hook type coil winding machine shown in FIG. 1.
Figure 26:
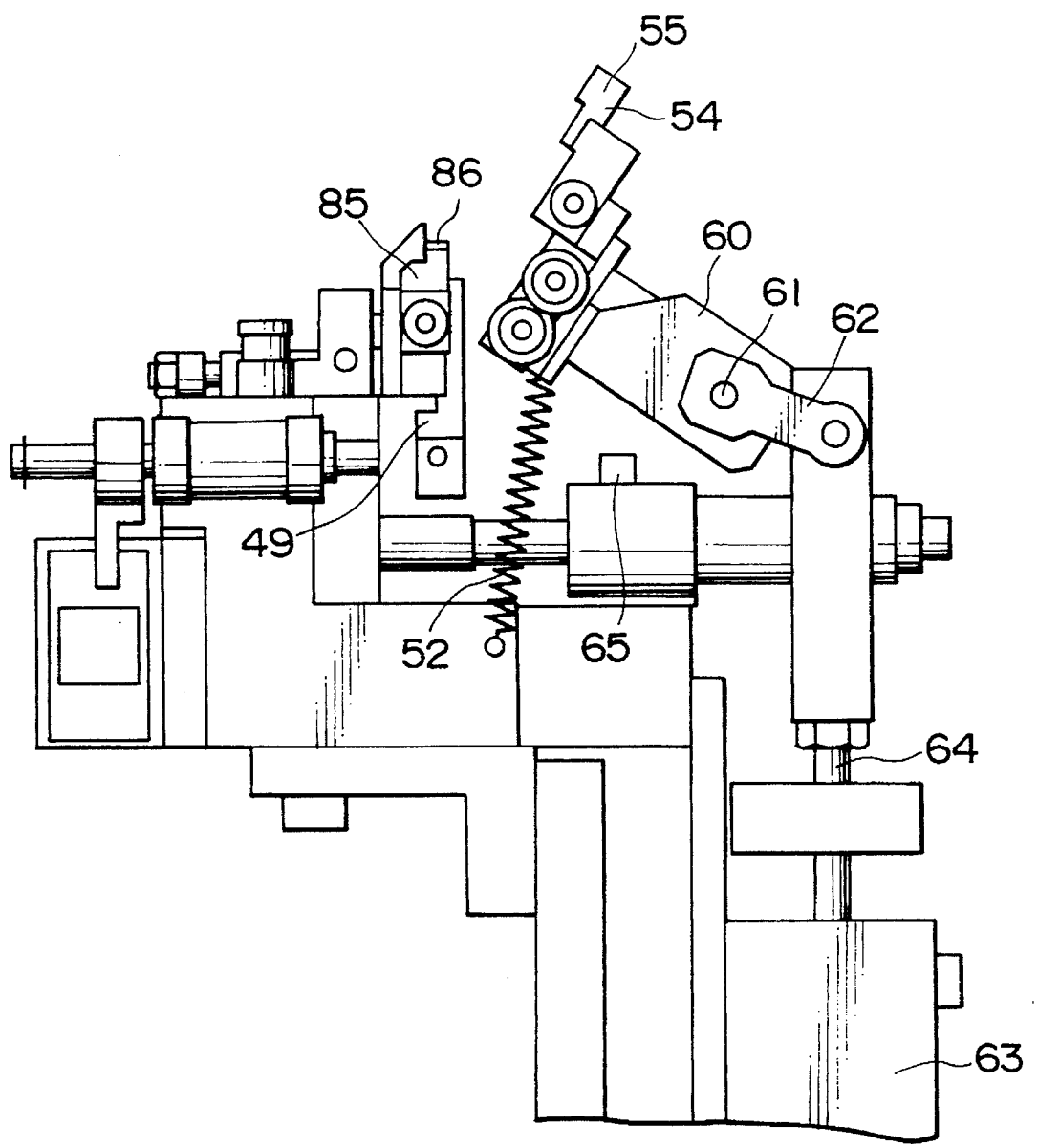
FIG. 26 is a front elevational view showing the wire holder of FIG. 25 but in an open condition.

Subsequently, a moving mechanism for a wire holder 54 for controlling, upon winding of a wire, a winding condition of an end portion of the wire in an axial direction of a coil being formed will be described. Referring to FIG. 25, the wire holder 54 is supported at an end portion of a support member 60. The support member 60 is supported for pivotal motion around a fulcrum pin 61. The support member 60 is connected to a connecting plate 62, and the other end of the connecting plate 62 is connected to a rod 64 of a cylinder 63. Consequently, operation of the cylinder 63 pivots the support member 60 as seen in FIG. 26 to retract the wire holder 54.

Figure 27:
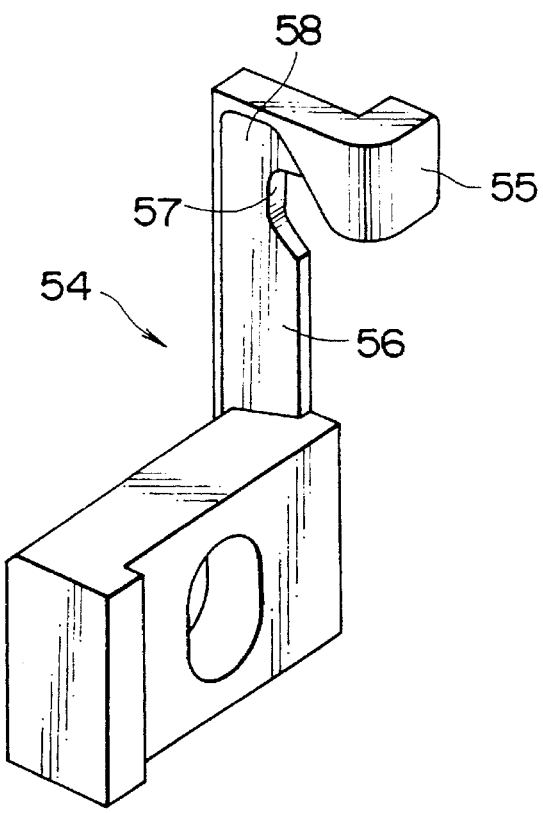
FIG. 27 is a perspective view showing an appearance of the wire holder.
Figure 28:
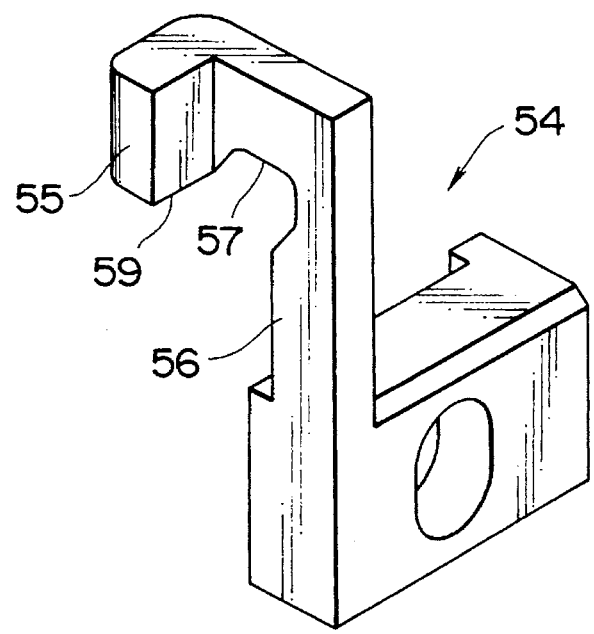
FIG. 28 is a similar view but showing another appearance of the wire holder as viewed in a different direction.
Figure 29:
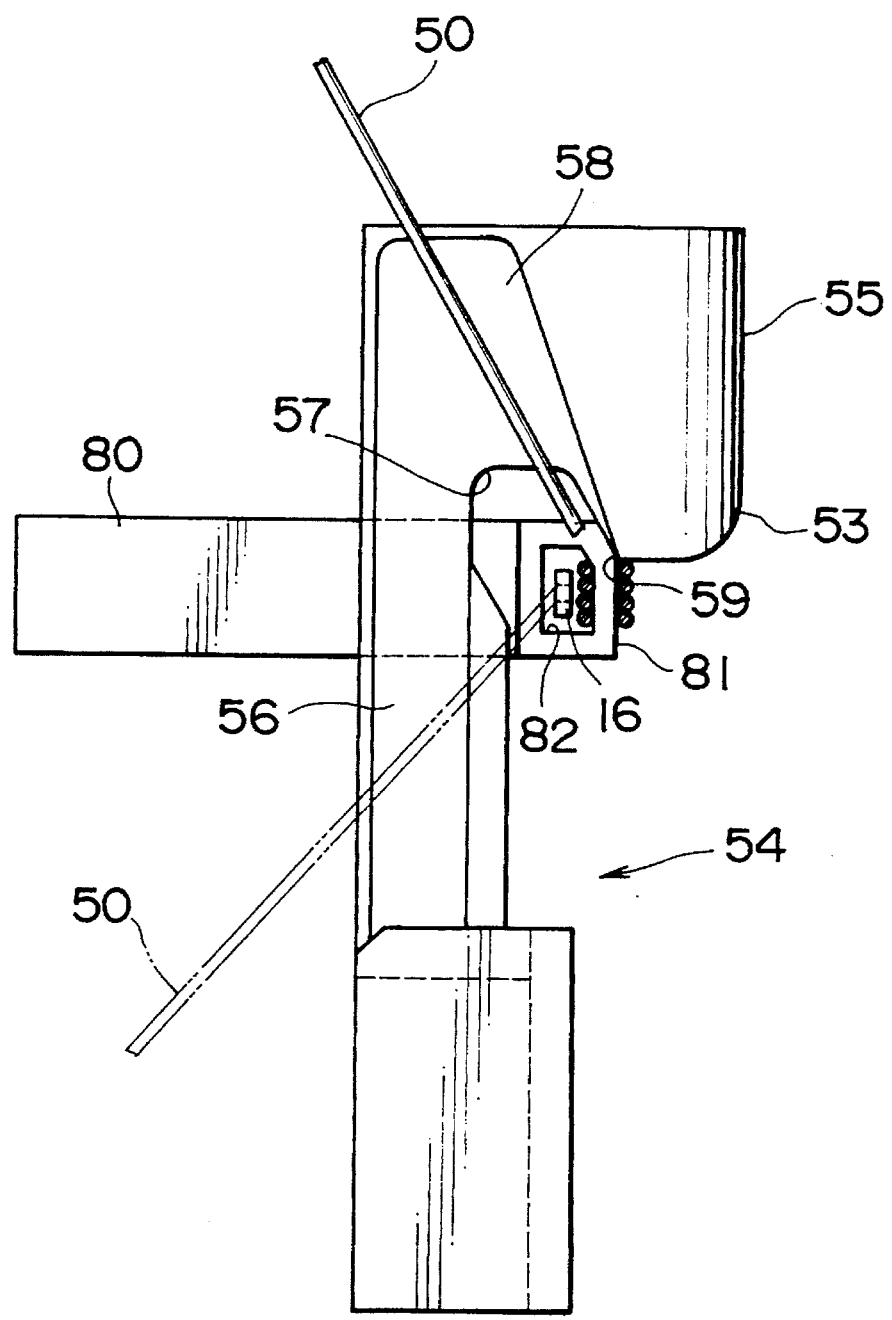
FIG. 29 is a front elevational view of the wire holder illustrating an operation of winding a wire while controlling an end portion of the wire using the wire holder.

The wire holder 54 includes a projection 55 at an upper end thereof as seen in FIGS. 27 and 28, and the projection 55 is supported on a base portion of the wire holder 54 by way of an arm 56. A recess 57 is formed at a root portion of the projection 55, and a concave portion 58 is formed adjacent an upper end of the recess 57 of the projection 55 (refer to FIG. 29). A ridge line portion 59 is formed from a sharp edge on the rear face side of the projection 55 and is adapted to control, upon winding of a wire, an end portion of the wire in an axial direction of a coil being formed as seen in FIG. 29.

Subsequently, an apparatus for inspecting a wound condition of a wire on a core will be described with reference to FIG. 33. The apparatus includes a winding section 66, which is constituted from the hooks 16 and the flyer chucks 17, and a television camera 67 and an illumination lamp 70 located in an opposing relationship to each other on the downstream side of the winding section 66 for fetching an image of a core 86 for which a wire has been wound.

The television camera 67 is connected to an image processing section 22, which is in turn connected to an interface (I/F) section 68. The interface section 68 is connected to a coil winding machine controller 69 which controls the entire coil winding machine. The coil winding machine controller 69 selectively separates products into conforming articles and non-conforming articles. A conforming article stocker 71 for accommodating such conforming articles therein and a non-conforming article stocker 72 for accommodating such non-forming articles therein are located on the downstream side of the winding section 66.

Operation of the coil winding machine having the construction described above will be described subsequently. First, general operation of the coil winding machine will be described with reference to FIG. 1. A wire 50 supplied from one of the wire supplying bobbins 11 is introduced to a position forwardly of a head core held by a chip holder 13 while tension is kept applied to it by the tension mechanism 12, and then the wire 50 is wound by cooperation of motion of the hook 16 in the forward and backward directions and turning motion of the flyer chuck 17. The condition of the wire 50 being wound is visually observed by eyesight by means of a microscope 21 if necessary or by way of the television camera 67 shown in FIG. 33, and image processing is performed by the image processing section 22.

The head core on which a head for which the wire 50 has been wound is held is discharged along the movable rail 26, and processing of a terminal end of the wire is performed by the terminal processing apparatus 27. Then, the work is taken out by the work taking out apparatus 28 and accommodated into the magazine 29.

Figure 2:
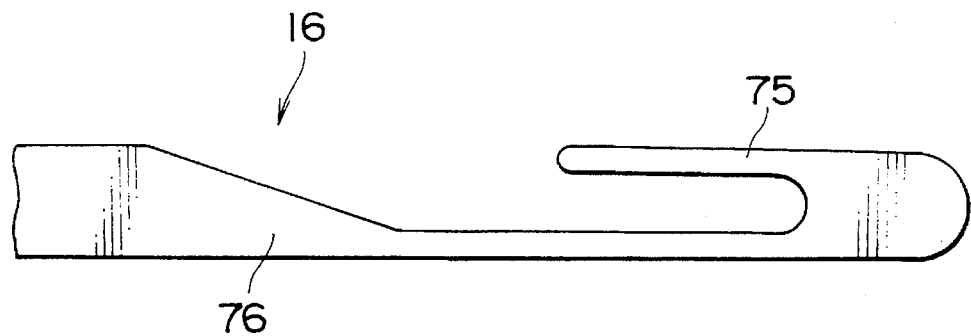
FIG. 2 is an enlarged front elevational view of a hook employed in the hook type coil winding machine shown in FIG. 1.

Subsequently, a hook 16 for cooperating with a flyer chuck 17 in order to wind a wire in such a manner as described above will be described. The hook 16 is produced by integral working of a plate member in the form of a thin plate and has a J-shaped catching portion 75 at an end thereof as seen in FIG. 2. The hook 16 has a fixed dimension in a vertical direction within a range of a predetermined length from the terminal end thereof and has an upper face inclined at a portion thereof farther than the predetermined length so as to increase the sectional area of the hook 16 toward the base end side of the hook 16 to form a leading portion 76. The leading portion 76 terminates at the position of, for example, 1.0 mm from the terminal end of the hook 16, and the dimension of the portion of the hook 16 in the vertical direction is 0.13 mm. A sufficient mechanical strength is assured by the construction just described.

Figure 3:
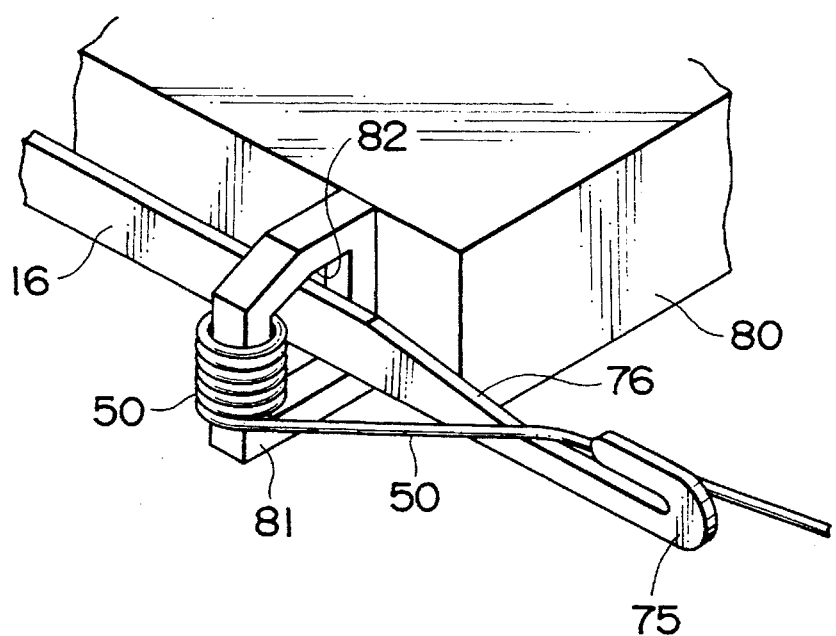
FIG. 3 is a perspective view illustrating a wire threading operation by the hook shown in FIG. 2.
Figure 4:
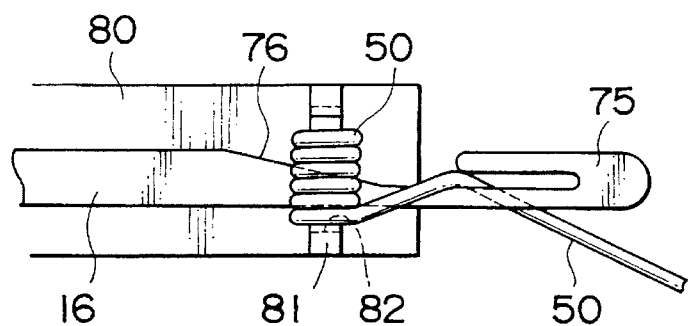
FIGS. 4 and 5 are a side elevational view and a front elevational view, respectively, illustrating the wire threading operation illustrated in FIG. 3.
Figure 5:
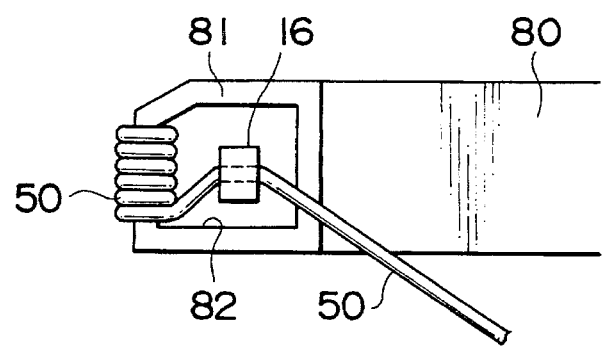
Figure 6:
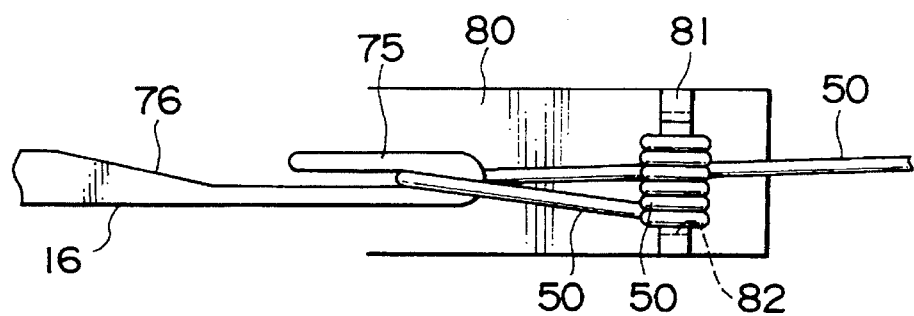
FIG. 6 is a side elevational view of a head core for which the wire threading operation has been completed.

FIGS. 3 to 6 illustrate a hooking or catching operation of the wire 50 by the hook 16. An end portion of the hook 16 is first advanced to pass through a core hole 82 of a core 81 provided on a slider 80 as seen in FIGS. 3 and 4, and then the wire 50 is led along the leading portion 76 of the hook 16, whereafter the wire 50 is hooked or caught by the J-shaped catching portion 75 as seen in FIGS. 4 and 5. In this condition, the hook 16 is pulled back, whereupon the wire 50 hooked by the J-shaped catching portion 75 is introduced into and threaded through the core hole 82 as shown in FIG. 6.

Figure 7:
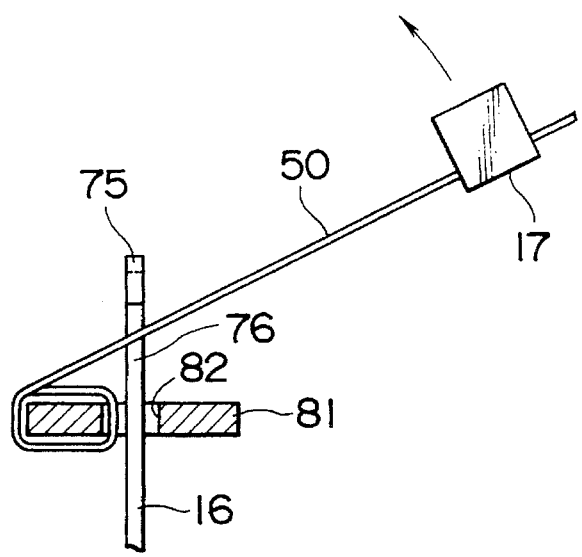
FIGS. 7 to 12 are enlarged plan views, partly in section, showing successive steps of a wire winding operation of the hook type coil winding machine shown in FIG. 1.

Subsequently, an operation of winding the wire 50 by the hook 16 and a cooperating flyer chuck 17 will be described with reference to FIGS. 7 to 12. While the hook 16 is fitted in and extends through the core hole 82 as seen in FIG. 7, the flyer chuck 17 is operated to hook the wire 50 by the J-shaped catching portion 75 of the hook 16 making use of the leading portion 76 of the hook 16.

Figure 8:
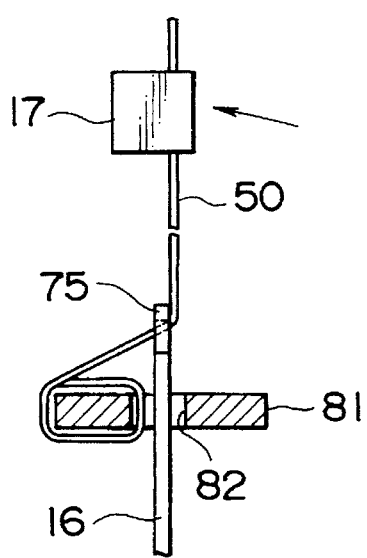
Figure 9:
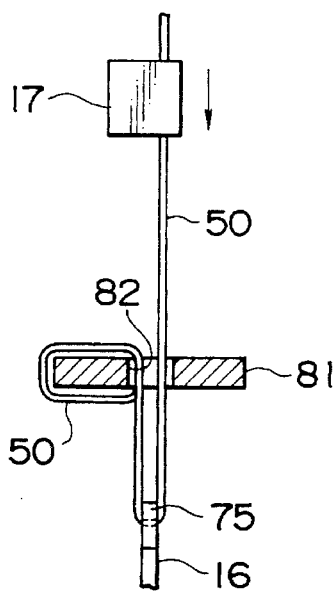

Thereafter, the flyer chuck 17 is turned in such a manner as seen in FIG. 8 until it moves to a position at which it is opposed to an end portion of the hook 16. In this condition, the hook 16 is pulled down as seen in FIG. 9 so that it is released from the core hole 82. Thereupon, the wire 50 hooked by the hook 16 is introduced into and threaded through the core hole 82.

Figure 10:
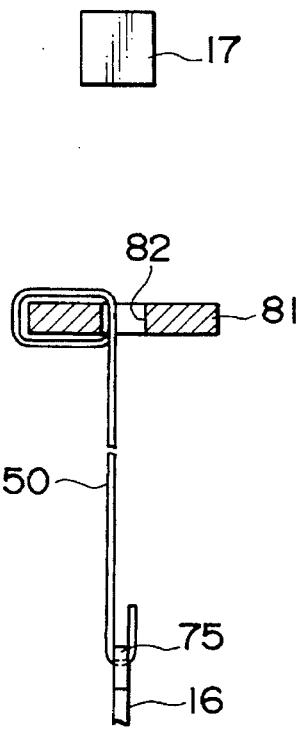
Figure 11:
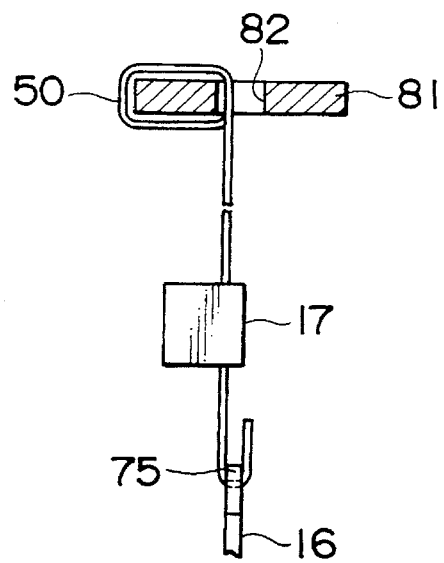
Figure 12:
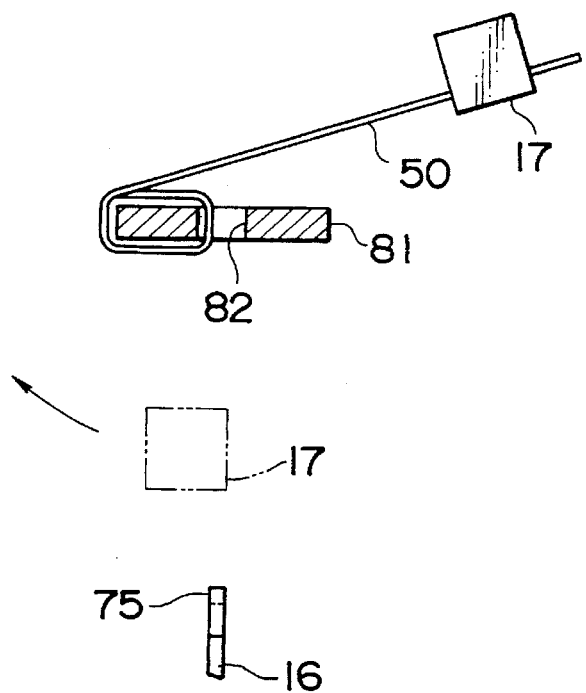

Thereafter, the wire 50 is released from the flyer chuck 17 as seen in FIG. 10. Consequently, the terminal end of the wire 50 is put into a free condition. Then, the flyer chuck 17 is turned to a position on the opposite side with respect to the core 81 as seen in FIG. 11, and then the wire 50 is chucked by the flyer chuck 17 adjacent the hook 16. Thereafter, the flyer chuck 17 is turned back to its original position as seen in FIG. 12. Consequently, the wire 50 passed through the core hole 82 is wound on the outer side of the core 81. The sequence of operations is repeated by a number of times equal to the number of turns to be wound on the core 81 so that the wire 50 is wound on the core 81 of the slider 80 thereby to assemble a head.

Figure 13:
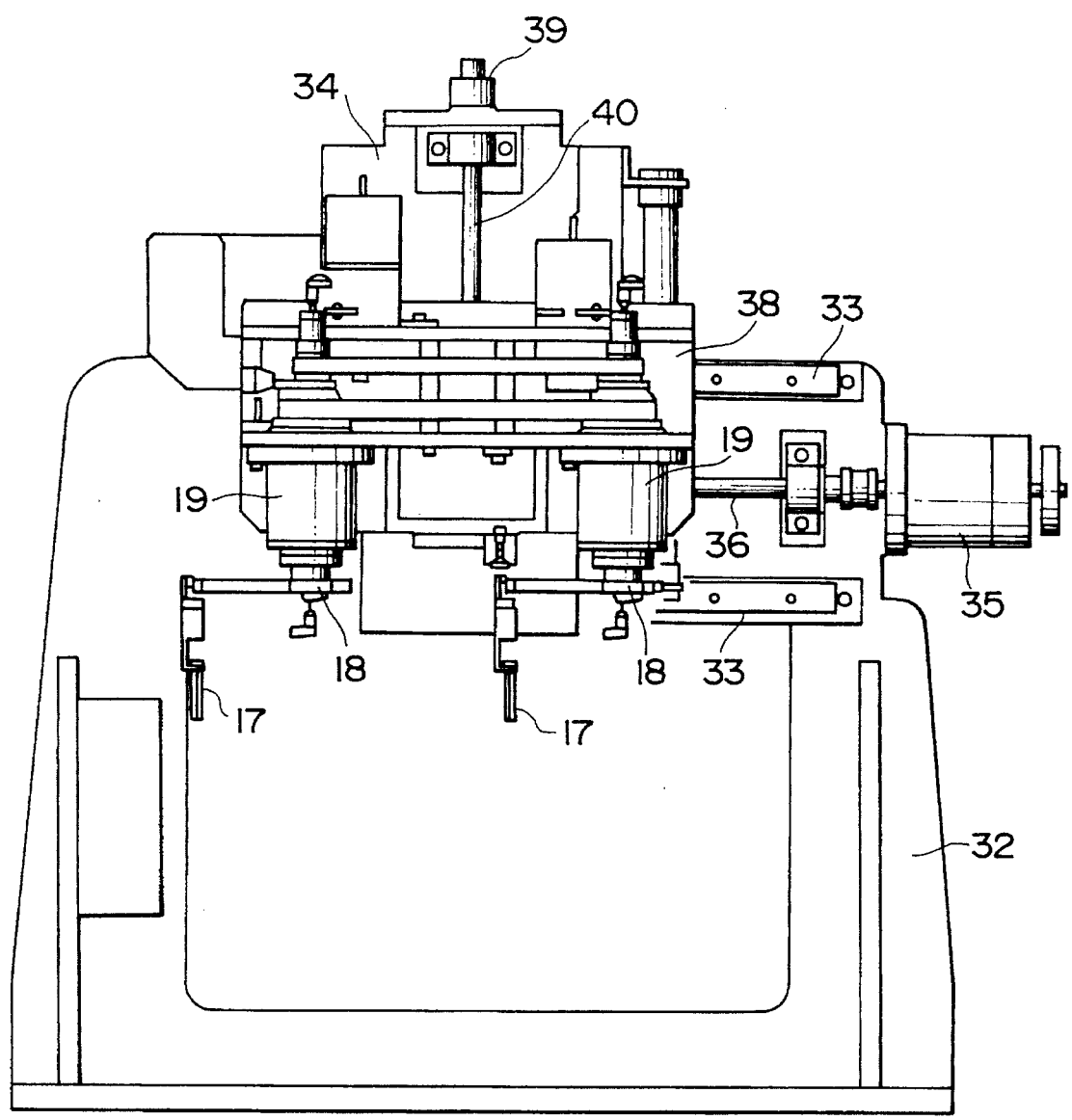
FIG. 13 is a front elevational view of a traverse mechanism for a flyer chuck of the hook type coil winding machine shown in FIG. 1.
Figure 14:
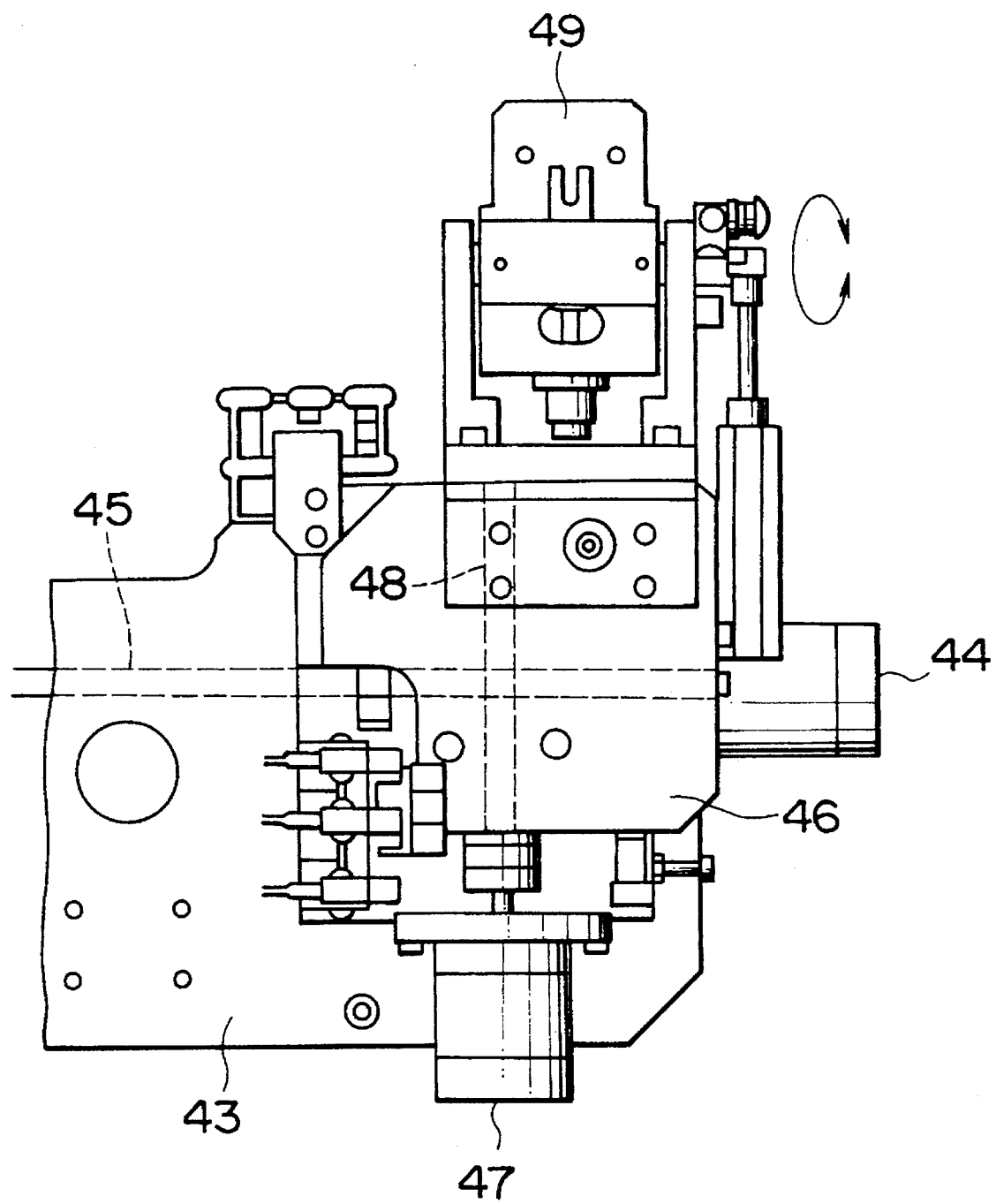
FIG. 14 is a partial front elevational view showing a traverse mechanism for a head core of the hook type coil winding machine shown in FIG. 1.
Figure 15:
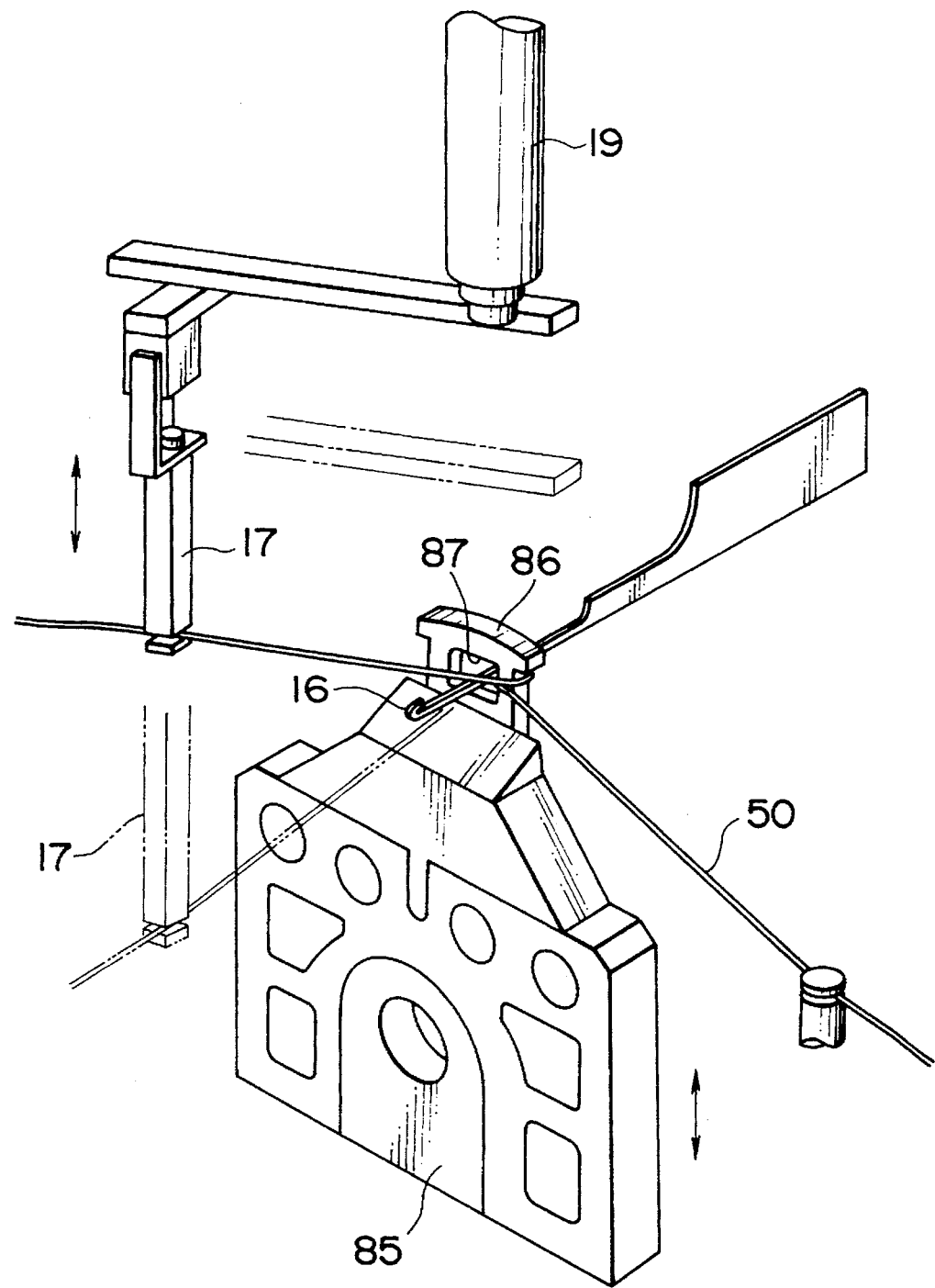
FIGS. 15 to 19 are enlarged front elevational views showing different steps of a process of winding a wire in a core hole of a head core by the hook type coil winding machine shown in FIG. 1.

Besides, with the present coil winding machine, aligned winding is achieved by a traverse mechanism for a flyer chuck 17 shown in FIG. 13 and another traverse mechanism for a head core 86 shown in FIG. 14. In particular, the flyer chuck 17 shown in FIG. 15 is moved in a vertical direction by means of the feed screw 40 shown in FIG. 13 while a head core 85 is adjustably moved in a vertical direction by means of the motor 47 and the feed screw 48 shown in FIG. 14.

Such an aligned winding operation for a coil of a magnetic head for a video tape recorder as described above will be described subsequently. As seen in FIG. 15, the hook type coil winding apparatus is constructed such that, in order to catch or hook the wire 50 by means of the hook 16, the wire 50 is clamped and turned by means of the flyer chuck 17 and besides the wire 50 is hooked by the hook 16 passed through a core hole 87 of the core 86 and is threaded through the core hole 87. Then as described hereinabove, here the hook type coil winding machine is constructed so that both of the head core 86 and the flyer chuck 17 can individually be moved upwardly or downwardly.

Figure 16:
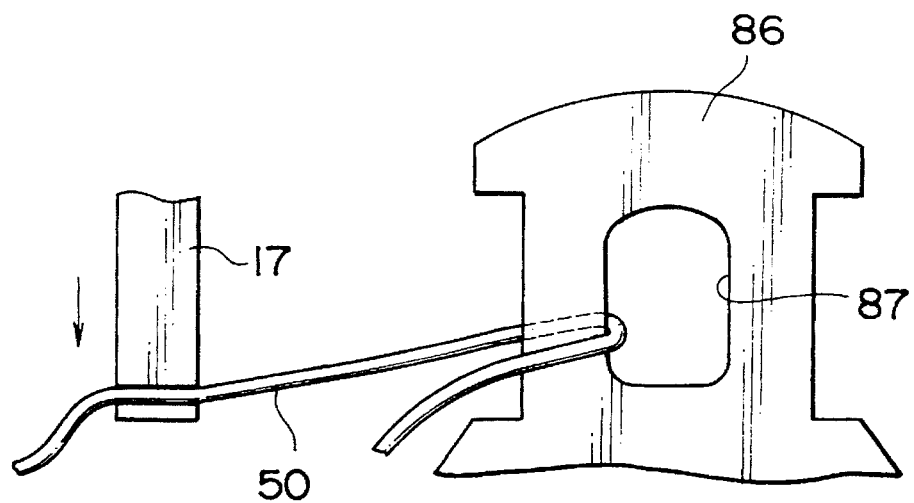
Figure 17:
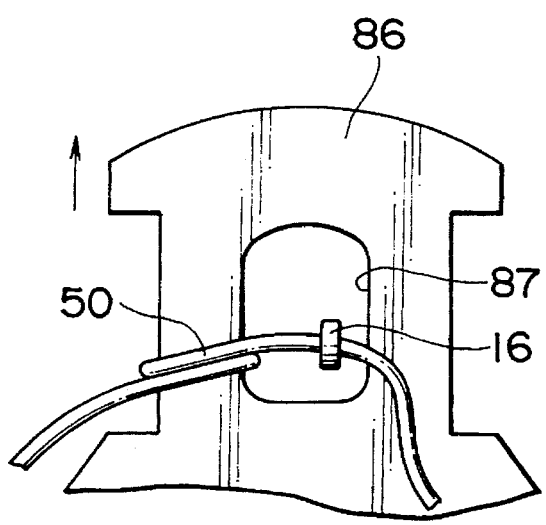

An operation of winding the wire 50 while it is controlled by means of such a mechanism as described above will be described. FIGS. 16 and 17 illustrate an example of operation wherein the wire 50 is controlled to a lower location of the core hole 87 of the head core 86. Here, when it is tried to wind the wire 50 on an outer side of a portion of the head core 86 outside the core hole 87, the flyer chuck 17 is moved downwardly as seen in FIG. 16. On the contrary when it is tried to thread the wire 50 into the inside of the core hole 87, the head core 86 is moved upwardly as seen in FIG. 17.

Figure 18:
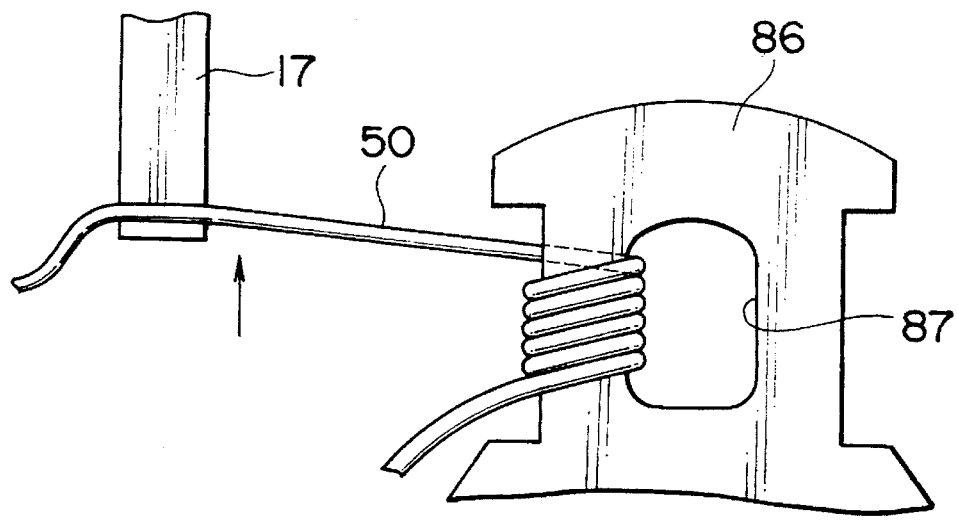
Figure 19:
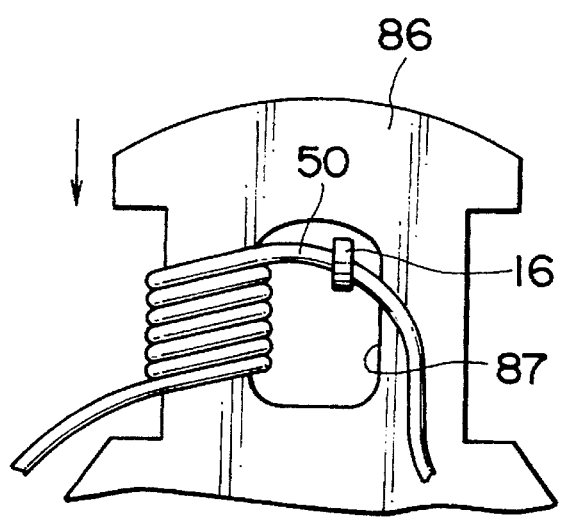

FIGS. 18 and 19 illustrate an operation of controlling the wire 50 to an upper location of the core hole 87. Conversely to the case wherein the wire 50 is to be controlled to a lower location of the core hole 87, the flyer chuck 17 is moved upwardly as seen in FIG. 18. Further, when the wire 50 is to be threaded through the core hole 86 of the head core 87, the head core 86 is moved downwardly to wind the wire 50 through the core hole 87.

Where the vertical positions of the flyer chuck 17 and the head core 86 are varied arbitrarily for each turn, the flyer chuck 17 can be controlled to an arbitrary position, and the alignment degree of the wound wire can be improved to increase the occupation rate of the wire 50 in the core hole 87.

A magnetic head obtained in this manner is improved in alignment degree of the wound wire 50. Besides, the occupation rate of the wound wire 50 in the core hole 87 is improved. Furthermore, the yield of magnetic heads is improved, and the deviation in characteristic among head cores constituting magnetic heads is reduced.

Figure 20:
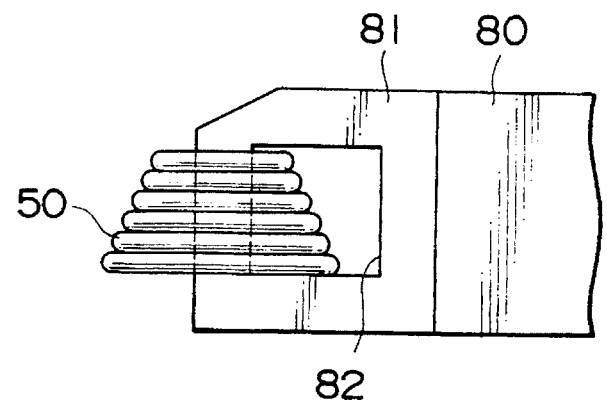
FIG. 20 is an enlarged front elevational view showing a wire wound on a core of a head slider by the hook type coil winding machine shown in FIG. 1.

Subsequently, an operation of winding a wire 50 on a core 81 for a head slider 80 for a hard disk drive will be described. In the hook type coil winding machine, using such a hook 16 as shown in FIG. 2, the wire 50 is hooked or caught by a portion of the leading portion 76 of the wire 50, and in this condition, the hook 16 is pulled back to thread the wire 50 through the core hole 82 of the head core 81. In particular, since the wire 50 is placed onto the hook 16 and pushed down by the flyer chuck 17 to hook the wire 50 by means of the hook 16 as seen in FIG. 3, a downwardly acting force acts for each threading operation, and this is repeated for each turn. Consequently, it becomes liable that the wire 50 gathers at a lower location, and as a result, a coil thus wound is liable to have such a wound wire shape which is swollen at a lower portion thereof as seen in FIG. 20.

Figure 21:
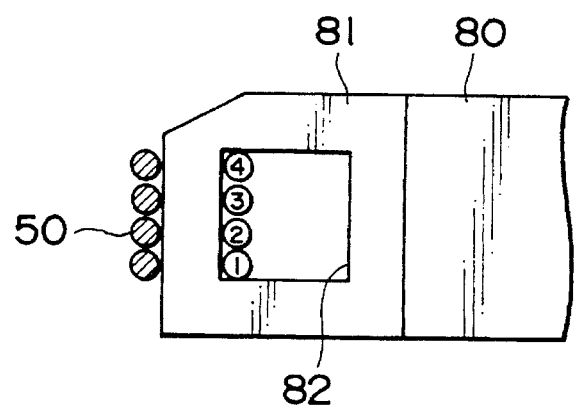
FIGS. 21 and 22 are schematic front elevational views, partly in section, illustrating different steps of a process of winding the wire shown in FIG. 20.

However, since portions in the first layer of the wire 50 wound on the head core 81 contact directly with the core 81 as shown in FIG. 21, they are wound in order from below due to the frictional force. Meanwhile, since portions of the wire 50 in the second layer are wound on the wire 50 wound already on the head core 81 as seen in FIG. 22, the frictional force thereof is a little lower, but since they are wound in order from above, they are liable to be wound in accordance with the order.

Figure 22:
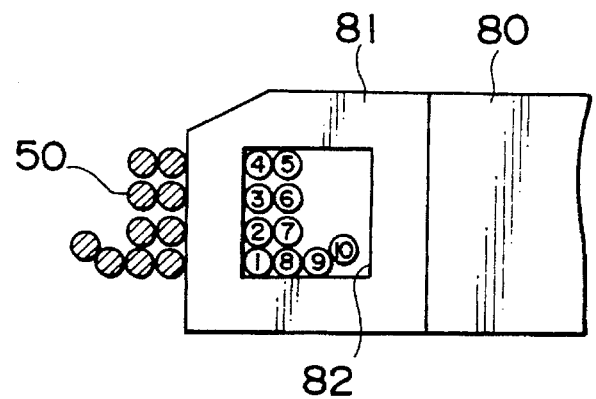

However, in the third layer of the wire 50, since the frictional force between portions of the wire 50 is low and besides the wire 50 is hooked by the flyer chuck 17 so that a downwardly acting force is applied to the hook 16, if the head core 81 or the flyer chuck 17 is adjusted in position in the vertical direction, then the wire 50 is not wound, upon the second turn, in a correctly aligned condition on the second layer, but it is inclined to gather at a lower location of the core hole 82 as seen in FIG. 22. Thus, in order to allow the portion of the wire 50 for the second turn to be wound with accuracy on the second layer, the traverse amount is increased suddenly at the portion of the wire 50. In particular, as seen from FIGS. 23 and 24, the traverse amount of the flyer chuck 17 and the traverse amount of the slider 80 are both increased.

Since a downwardly acting force is applied upon winding to the wire 50 and the wire 50 is wound, for the third layer, on the wire 50 already wound, the wound turns of the wire 50 are liable to gather at a lower location due to low friction among them, and consequently, at the second turn from below of the third layer, the core 81 and the flyer chuck 17 are traversed by great amounts so as to establish balance with the downwardly acting force thereby to cause the wire 50 to be wound at a predetermined position.

Figure 23:
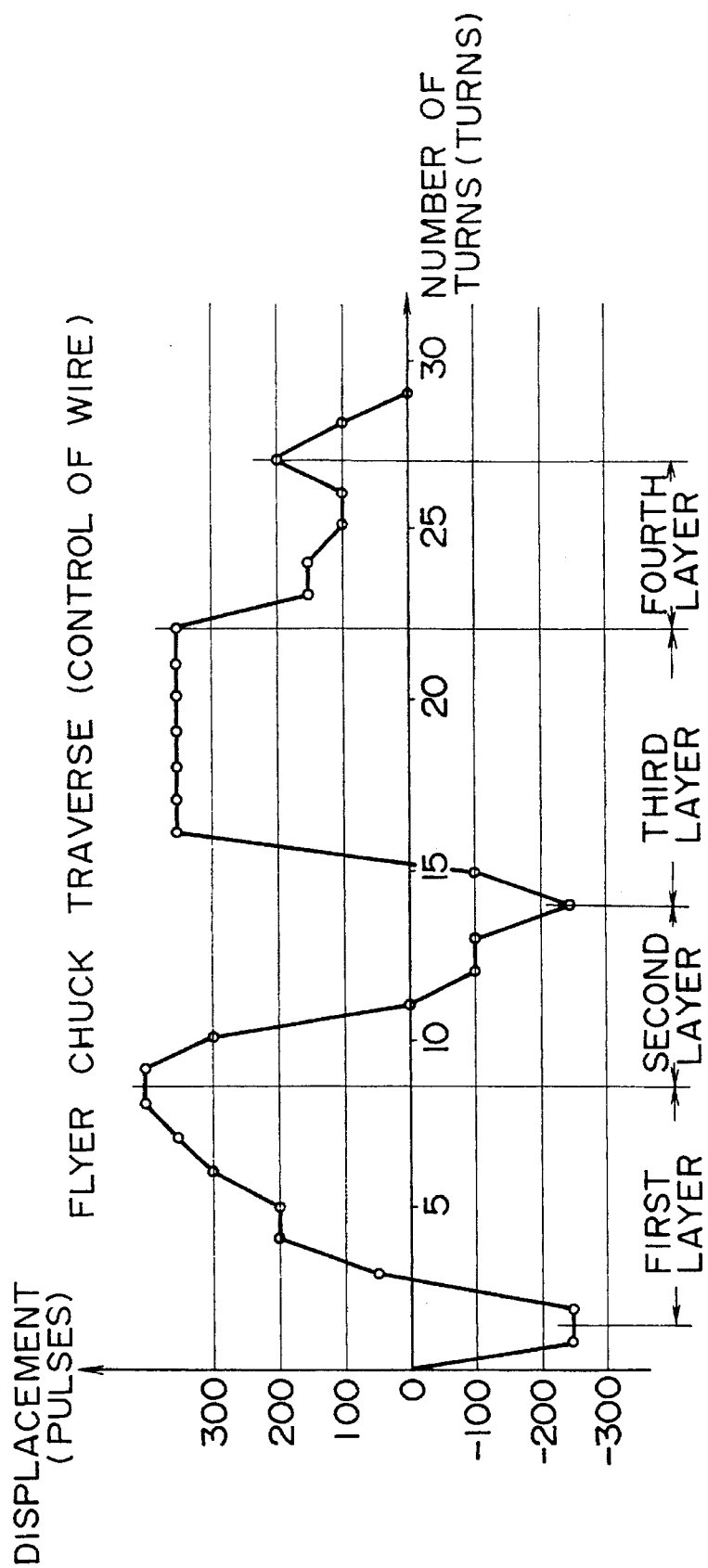
FIG. 23 is a graph showing the traverse amount of the flyer chuck.
Figure 24:
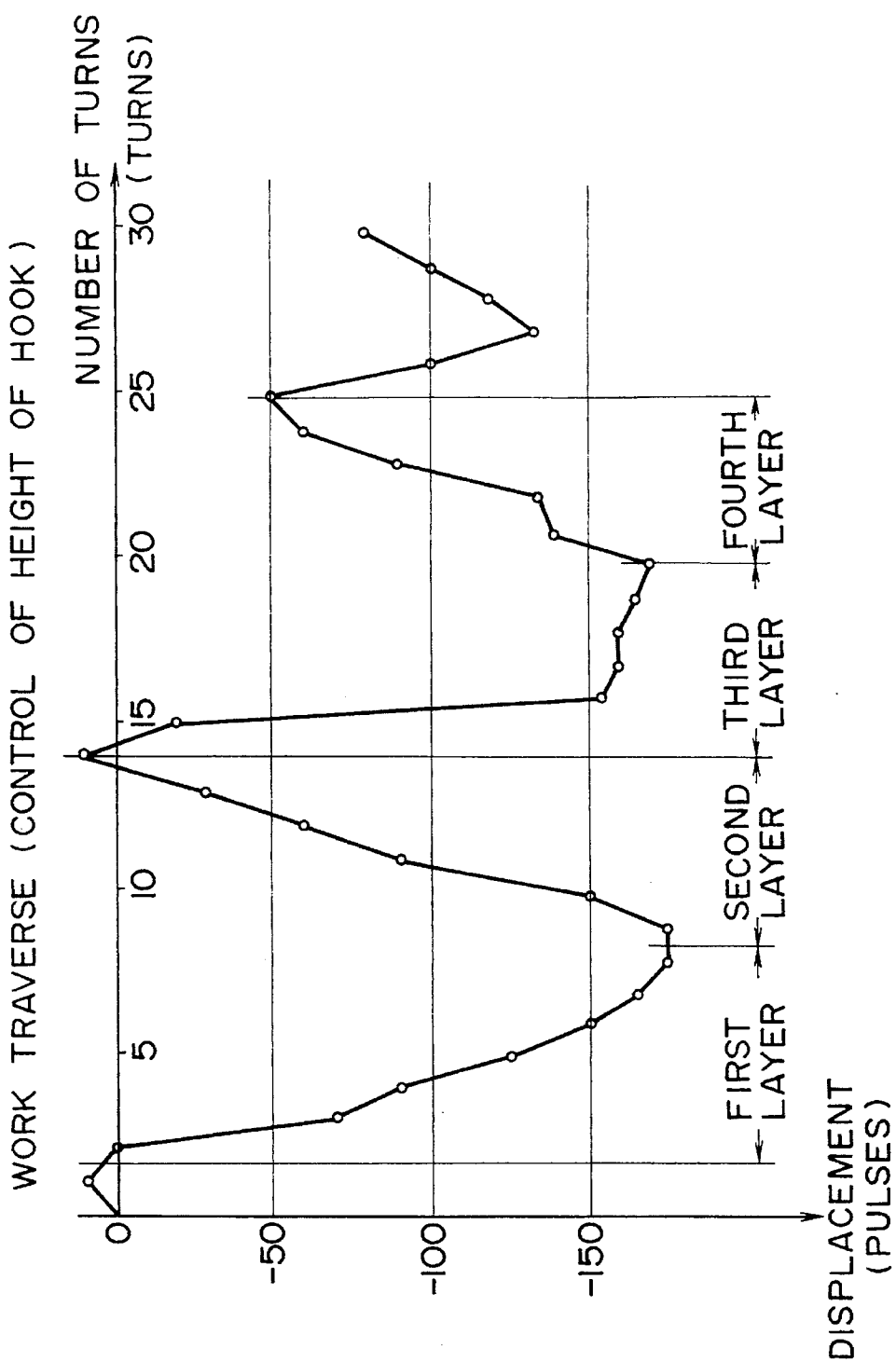
FIG. 24 is a graph showing the traverse amount of a work.

Here, while it is also possible to traverse the core 81 and the flyer chuck 17 by greater amounts at the third turn from below of the third layer, since the magnitude of the core hole 82 is definite and the clearance from the hook 16 is limited, there is a limitation in the extent of the traverse. Then, since the core 81 and the flyer chuck 17 are traversed by great amounts at the second turn from below, at the third turn from below of the third layer, even if the core 81 and the flyer chuck 17 are traversed by smaller amounts than those at the second turn, the wire 50 is raised sufficiently so that it is wound correctly at its predetermined position. This similarly applies to the fourth or following turn from below of the third layer. In other words, by providing such traverses as seen in FIGS. 23 and 24 to the flyer chuck 17 and the work 80, respectively, also the third layer can be wound in an aligned condition.

It is to be noted that, as described hereinabove, in the present hook type coil winding machine, the flyer chuck 17 and the work 80 are traversed independently of each other. This is based on the following reasons. In particular, when the hook 16 is at a position remote from the flyer chuck 17, even if the flyer chuck 17 is moved upwardly, if the hook 16 is positioned below the flyer chuck 17, then the wire 50 is wound at a lower location, and consequently, a sufficient effect cannot be achieved.

Further, where only the slider 80 is traversed, there is a disadvantage in that, when the flyer chuck 17 is at a position remote from the hook 16, even if it is desired to wind the wire 50 at a higher location, the wire 50 is wound at a lower location due to the position of the flyer chuck 17.

In order to eliminate such two disadvantages as described above, in the present hook type coil winding machine, the flyer chuck 17 and the slider 80 are adjustably moved upwardly or downwardly independently of each other, thereby to allow a wire to be wound in aligned condition on both of the head core 86 for a magnetic head and the core 81 of the slider 80 for a hard disk drive.

Subsequently, an operation of controlling an end portion of a coil formed from the wire 50 wound on the core 81 will be described. The mechanism for the operation is constituted from a drive mechanism for the wire holder 54 shown in FIG. 25 and the wire holder 54 shown in FIGS. 27 and 28.

The wire holder 54 is mounted on the drive mechanism shown in FIG. 25 so that it can be moved by operation of the cylinder 63 of the drive mechanism between a pair of positions including a coil winding position shown in FIG. 25, that is, a position at which a coil winding operation is performed, and a supply/discharge position shown in FIG. 26, that is, a position at which mounting and dismounting of the slider 80, an appearance inspection and image processing are performed. The wire holder 54 has such a characteristic profile as seen in FIGS. 27 to 29 and is located in the very proximity of the head core 81 mounted in position. The wire holder 54 has such a surface as prevents, during a wire winding operation, an end portion of a coil forming portion of the wire from swelling in a thrust direction so that the surface of the coil may be formed along the surface of the wire holder 54, and has a function as a guide by which, during a wire winding operation, the wire 50 is wound smoothly without any trouble.

When the wire holder 54 is moved to the supply/discharge position as shown in FIG. 26, the wire holder 54 is spaced away from the core 81 to produce an open space in the proximity of the core 81. Consequently, mounting and dismounting of the core 81 to and from the wire winding position and an appearance inspection are facilitated remarkably.

Subsequently, a controlling operation for the wire 50 by the wire holder 54 upon winding will be described with reference to FIGS. 29 and 30. The projection 55 of the wire holder 54 is positioned such that the ridge line portion 59 formed from the sharp edge of the projection 55 defines a gap smaller than the dimension of the outer diameter of the wire 50 from the end of the core 81 shown in FIG. 30. If the wire 50 is wound in this condition, then the wire 50 cannot rise above the ridge line 59. This is because the gap between the projection 55 and the head core 81 is smaller than the diameter of the wire 50.

Figure 31:
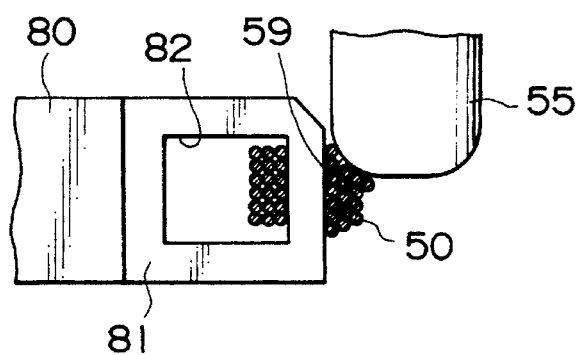
Figure 32:
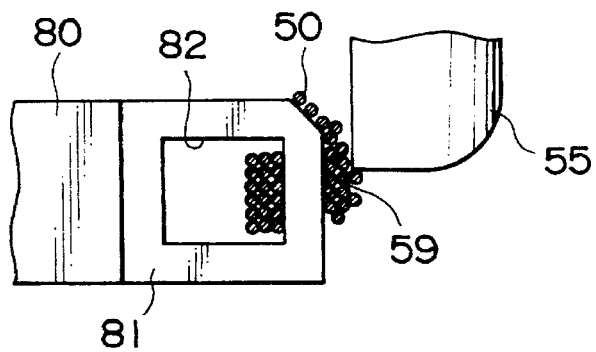

If otherwise the ridge line portion 59 is formed not from an edge but from a curved face, then the wire 50 will enter between the projection 55 and the head core 81 as shown in FIG. 31, resulting in getting out of shape of the coil. In the meantime, if the gap between the projection 55 and the head core 81 is larger than the outer diameter of the wire 50, the wire 50 will enter the gap between the core 81 and the projection 55 as shown in FIG. 32, resulting in getting out of shape of the coil.

Generally, of whichever type the head is, if the wire 50 protrudes from a signal reading face of the head, that is, from a face to contact with a recording medium such as a disk or a tape, the recording medium may be damaged by the wire 50. In particular, if a wire is wound in such a manner as seen in FIG. 32, then the head is a non-conforming article. The head shown in FIG. 31 cannot be said to be a good article. In other words, it is very significant that the ridge line portion 59 formed from a sharp edge is formed on the projection 55 and the clearance between the head core 81 and the projection 55 is set smaller than the diameter of the wire 50.

Figure 30:
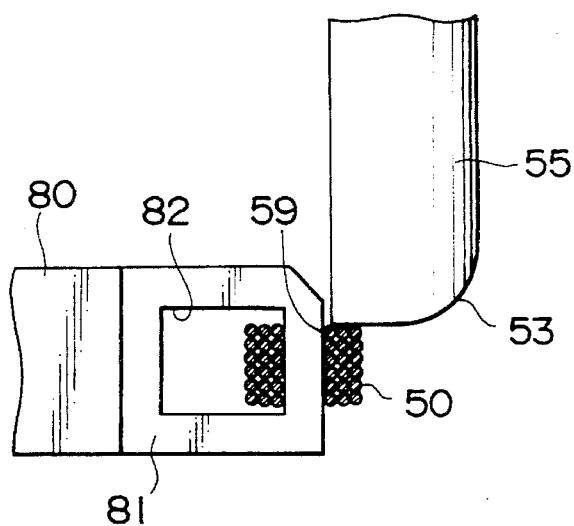
FIGS. 30 to 32 are partial enlarged front elevational views, partly in section, illustrating different stages of an operation of controlling a wire during winding by a projection of the wire holder.

Since a lower face of the projection 55 whose end portion is formed from the ridge line portion 59 is contacted with an upper face of the coil formed from the wire 50 as seen in FIG. 30, the coil follows the lower face of the projection 55. Accordingly, if the wire holder 54 is retracted after the wire 50 is wound in this manner, then the upper face of the coil exhibits a flat finish. This is because the wire 50 is wound following the lower face of the projection 55. Further, since a portion of the wire holder 54 on the lower end side of the projection 55 and remote from the ridge line portion 59 formed from a sharp edge is constituted from the guide face 53 formed from a curved face, during a winding operation, the wire will not wrap around the projection 55 of the wire holder 54. Consequently, the wire 50 will not become loose.

Further, as shown in FIG. 29, the recess 57 and the concave portion 58 are formed at the locations of the wire holder 54 adjacent the root of the projection 55, and when the wire 50 is moved upwardly in a wire winding operation which is performed using the hook 16, the recess 57 and the concave portion 58 allow the wire 50 to escape as indicated by a solid line in FIG. 29. This is because, in the hook type coil winding machine, in order to perform an operation of hooking the wire 50 with the hook 16, a series of operations are performed wherein, before the hook 16 is inserted into the head core 81, the wire is moved upwardly, and then the hook 16 is inserted into the core hole 82, whereafter the wire 50 is moved downwardly as indicated by a chain line in FIG. 29 to place the wire 50 onto the leading portion 76 of the hook 16 and then the hook 16 is pulled down. Upon such operation, if the recess 57 and the concave portion 58 are not provided, then the wire 50 cannot be raised sufficiently, resulting in failure to hook the wire 50 with the hook 16.

In the meantime, if the wire holder 54 is positioned in the proximity of the head core 81, there is the possibility that the wire holder 54 may interfere with the work mounting plate 49 on which the head core 81 is held or the coil may interfere, upon removal, with the work holder 54, resulting in failure to remove the coil. Further, an appearance inspect of the coil may become difficult or impossible. In other words, even if the wire 50 protrudes, it will not be observed behind the wire holder 54 shown in FIG. 29. If the inspection is a visual inspection, the protrusion of the wire 50 may possibly be observed if the angle of the eyesight is changed, but with an image processing check by the television camera 67, such inspection is impossible.

In order to eliminate the disadvantage just described, the wire holder 54 is retracted by the drive mechanism as shown in FIG. 26. In particular, when the cylinder 63 is rendered operative, the support member 60 is pivoted in the clockwise direction around the fulcrum pin 61 in FIG. 26. Thereupon, the wire holder 54 supported at the end portion of the support member 60 is turned rightwardly upwards by the pivotal motion of the support member 60. Consequently, no member is present between the head core 81 and the television camera 67 any more, and the entire head can be watched by the television camera 67.

In order to perform winding, the cylinder 63 is operated in the reverse direction to move the wire holder 54 back to its winding position as seen in FIG. 25. Upon such reverse operation of the cylinder 63, the support member 60 having the wire holder 54 thereon is pivoted in the clockwise direction around the fulcrum pin 61 by the resilient returning force of the return spring 52 so that the wire holder 54 approaches the head core 81. Finally, the support member 60 is stopped by the stopper 65, and a fixed positional relationship is established between the wire holder 54 and the head core 81.

Since the fulcrum pin 61 on which the support member 60 shown in FIGS. 25 and 26 is supported is held with a high degree of accuracy by means of a bearing, also the support member 60 and the wire holder 54 are driven while keeping high rigidities. Also when the support member 60 collides with the stopper 65, the wire holder 54 is resiliently biased downwardly by the force of the return spring 52 without any play. Accordingly, the projection 55 of the wire holder 54 is positioned correctly every time with three-dimensionally same clearances with respect to the head core 81. Accordingly, it does not occur that the wire holder 54 interferes with and destroys the head core 81. Further, since the clearance between the wire holder 54 and the head core 81 is fixed, also the wound shape of a coil is normally fixed. Accordingly, if the wire holder 54 is adjusted in position with respect to the head core 81 and fixed to the arm 56 once, the position of the same is not thereafter varied when it is driven to move.

Figure 33:
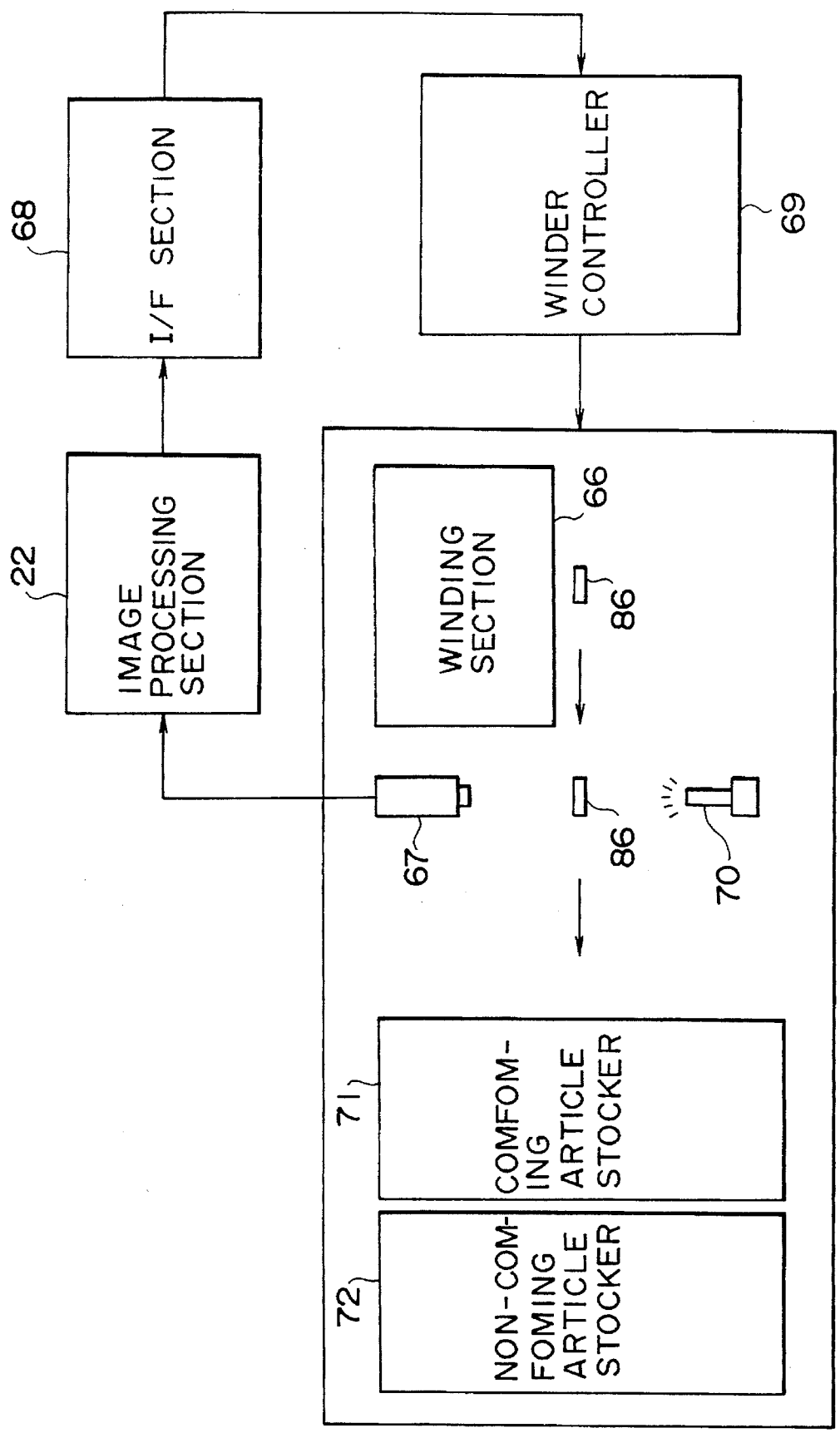
FIG. 33 is a block diagram of a wound wire shape inspection apparatus.

After winding is performed in this manner, the head core 81 or the magnetic head 86 is inspected by means of the wound wire shape inspection apparatus shown in FIG. 33. An inspection operation will be described subsequently. In particular, the video head 86 wound by the winding section 66 is supplied to a position between the television camera 67 and the lamp 71, and an image of the magnetic head 86 is fetched into the television camera 67. The image thus fetched is supplied to the image processing apparatus 22, by which image processing is performed. Then, a result of the processing is sent by way of the interface section 68 to the controller 69 which controls the entire coil winding machine. The controller 69 stocks, when the result of the processing is normal, the magnetic head 86 into the conforming article stocker 71. On the contrary when the magnetic head has some defect, the magnetic head is stocked into the non-conforming article stocker 72.

Figure 34:
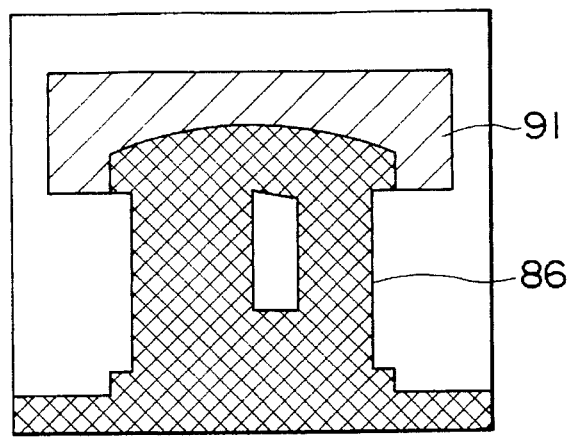
FIGS. 34 to 36 are front elevational views illustrating images picked up by a television camera.

An image processing operation of the image processing section 22 is such as described below. FIG. 34 shows a condition before a wire is wound on the head core 86 of the video head. In the present apparatus, prior to a winding operation, an image of the video head is fetched, and a condition of a slanting line portion 91, that is, a wire winding inhibited portion, is stored. Since the head core 86 is positioned between the illumination lamp 71 and the television camera 67, a location of the image at which the head core 86 of the video head is present is reflected dark as seen in FIG. 34 as light is intercepted by the head core 86.

Figure 35:
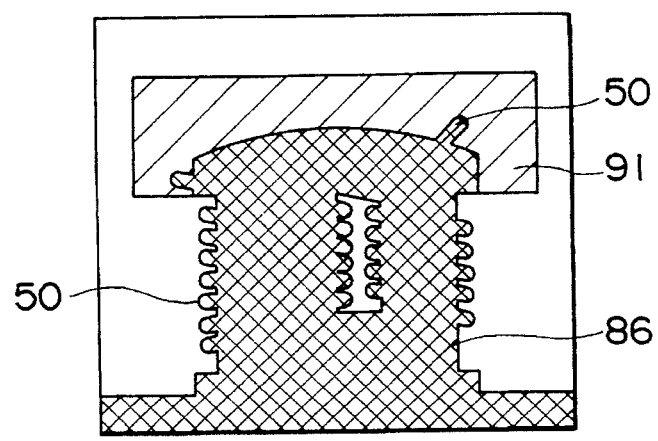
Figure 36:
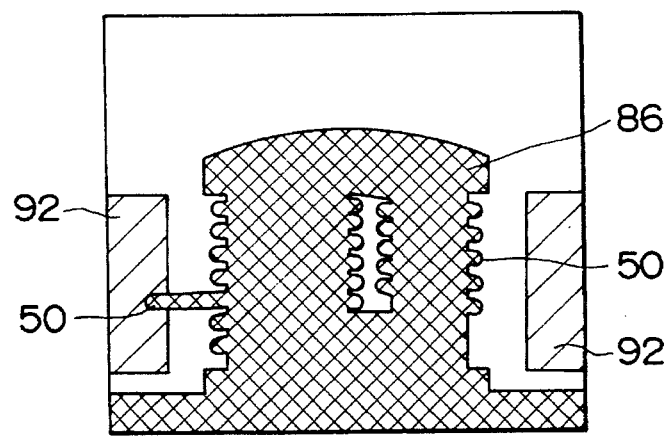

After a wire is wound, an image is fetched again by the television camera 67. Then, the condition of the slanting line portion 91 is compared with that before the wire is wound. If the wire is wound in the slanting line area 91, then a shadow of the wire 50 appears as seen in FIG. 35, and in this instance, the head core 86 is determined as a defective or non-conforming article. Meanwhile, attention is paid to the opposite side slanting line areas 92 in FIG. 36, and when a shadow of the wire 50 is recognized in either of the areas, the head core 86 is determined as a loosely wound defective or non-conforming article. When a shadow appears in any of the slanting line areas 91 and 92 in this manner, the head core 86 is selectively supplied into the non-conforming article stocker 72.

Since such a wound wire shape inspection apparatus as described above is provided, a head core of a non-conforming article will not be supplied to succeeding steps of the hook type coil winding machine, and consequently, the productivity at the succeeding steps is improved. Further, the conventional inspection which is based on visual observation can be improved, in terms of its fuzzy determination, by quantitative determination based on image processing, and an inspection can be performed with a higher degree of accuracy. Further, the conventional wound wire inspection step based on visual observation can be eliminated, and consequently, remarkable reduction of the cost can be achieved.

Having now fully described the invention, it will be apparent to one of ordinary skill in the art that many changes and modifications can be made thereto without departing from the spirit and scope of the invention as set forth herein.

What is claimed is:

1. A hook type coil winding machine, comprising:

supporting means for supporting thereon a core which has a core hole formed therein such that a wire to be wound on the core can be threaded through the core hole;

a chuck operable to grasp and move the wire to a predetermined position;

a hook operable to move through the core hole of the core supported on said supporting means to catch the wire at the predetermined position and then move back through the core hole to thread the wire through the core hole; and lift position adjustment means for moving said supporting means in a vertical direction to adjust a vertical position of the core on said supporting means to an adjusted position upon the movement of said hook back through the core hole and upon the movement of said chuck which results in a winding of the wire on the core at the adjusted position.

2. A hook type coil winding machine according to claim 1, wherein an upper wire layer formed by a plurality of turns of the wire is formed on a lower wire layer including a plurality of turns of the wire, and wherein a flyer chuck displacement amount when said chuck is moved upwardly or downwardly in a single winding operation for a turn is set greater upon formation of the upper layer of the wire than upon formation of the lower layer of the wire.

3. A hook type coil winding machine according to claim 1, further comprising a wire holder located in an opposing relationship to an end portion of the wire in an axial direction of a coil being formed when the wire is threaded through the core hole and wound on the core, wherein the end portion of the wire is controlled by the wire holder.

4. A hook type coil winding machine, comprising:

supporting means for supporting thereon a core which has a core hole formed therein such that a wire to be wound on the core can be threaded through the core hole;

a chuck operable to grasp and move the wire to a predetermined position;

a hook operable to move through the core hole of the core supported on said supporting means to catch the wire at the predetermined position and then move back through the core hole to thread the wire through the core hole; and lift position adjustment means for moving said chuck in a vertical direction to adjust a vertical position of said chuck to an adjusted position upon the movement of said hook back through said core hole and upon the movement of said chuck which results in a winding of the wire on the core at the adjusted position.

5. A hook type coil winding machine according to claim 4, wherein an upper wire layer formed by a plurality of turns of the wire is formed on a lower wire layer including a plurality of turns of the wire, and wherein a flyer chuck displacement amount when said chuck is moved upwardly or downwardly in a single winding operation for a turn is set greater upon formation of the upper layer of the wire than upon formation of the lower layer of the wire.

6. A hook type coil winding machine according to claim 4, further comprising a wire holder located in an opposing relationship to an end portion of the wire in an axial direction of a coil being formed when the wire is threaded through the core hole and wound on the core, wherein the end portion of the wire is controlled by the wire holder.

* * * * *